(12) United States Patent
Ishimaru et al.

(10) Patent No.: US 10,012,722 B2
(45) Date of Patent: Jul. 3, 2018

(54) MONITORING APPARATUS AND NON-TRANSITORY COMPUTER-READABLE MEDIUM

(71) Applicant: DENSO CORPORATION, Kariya-city, Aichi-pref. (JP)

(72) Inventors: Kazuhisa Ishimaru, Nagoya (JP); Kiyokazu Takagi, Kariya (JP); Naoki Kawasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 351 days.

(21) Appl. No.: 14/905,951

(22) PCT Filed: Jun. 25, 2014

(86) PCT No.: PCT/JP2014/066783
§ 371 (c)(1),
(2) Date: Jan. 18, 2016

(87) PCT Pub. No.: WO2015/008592
PCT Pub. Date: Jan. 22, 2015

(65) Prior Publication Data
US 2016/0154094 A1  Jun. 2, 2016

(30) Foreign Application Priority Data

Jul. 19, 2013  (JP) .................................. 2013-150503

(51) Int. Cl.
*G01C 3/08* (2006.01)
*G01S 7/48* (2006.01)
(Continued)

(52) U.S. Cl.
CPC .......... *G01S 7/4802* (2013.01); *G01S 7/4873* (2013.01); *G01S 17/42* (2013.01); *G01S 17/936* (2013.01); *G08G 1/16* (2013.01)

(58) Field of Classification Search
CPC ...... G01S 17/936; G01S 17/42; G01S 7/4802; G01S 7/4873; G08G 1/16
(Continued)

(56) References Cited

U.S. PATENT DOCUMENTS 5,629,669 A * 5/1997 Asano ................ B60K 31/0008
340/435
7,729,858 B2 * 6/2010 Koike ................... B60W 30/08
340/436
(Continued)

FOREIGN PATENT DOCUMENTS

JP  2009-110168 A  5/2009
JP  4956374 B2  6/2012
(Continued)

OTHER PUBLICATIONS

International Search Report (translated version); International Application No. PCT/JP2014/066783, filed Jun. 25, 2014; 3 pages.
(Continued)

*Primary Examiner* — Mark Hellner
(74) *Attorney, Agent, or Firm* — Knobbe, Martens, Olson & Bear, LLP

(57) ABSTRACT

A monitoring apparatus is provided. When a determination process of determining whether or not the part of an object located in a search range is an airborne substance, a rangefinder measures a distance to the object located in the search range for each of a plurality of unit areas forming the search range, a variation measure calculator calculates a variance of the distances (individual distances) measured for the respective unit areas, a variable threshold setter variably sets a variation measure threshold based on the individual distances, and a determiner determines that at least part of the object is an airborne substance if the calculated variance exceeds the variation measure threshold.

7 Claims, 9 Drawing Sheets

(51) Int. Cl.
    *G01S 17/42* (2006.01)
    *G08G 1/16* (2006.01)
    *G01S 17/93* (2006.01)
    *G01S 7/487* (2006.01)

(58) Field of Classification Search
    USPC ........................................................ 356/4.01
    See application file for complete search history.

(56) References Cited

U.S. PATENT DOCUMENTS

| | | | |
|---|---|---|---|
| 8,380,426 B2 * | 2/2013 | Konijnendijk | G01S 13/723 |
| | | | 701/301 |
| 2012/0294482 A1 | 11/2012 | Kasaoki | |

FOREIGN PATENT DOCUMENTS

| | | | |
|---|---|---|---|
| JP | 2012-243049 A | 12/2012 | |
| WO | 2015/008592 A1 | 1/2015 | |

OTHER PUBLICATIONS

International Preliminary Report on Patentability; International Application No. PCT/JP2014/066783; Filed: Jun. 25, 2014 (with English translation).

* cited by examiner

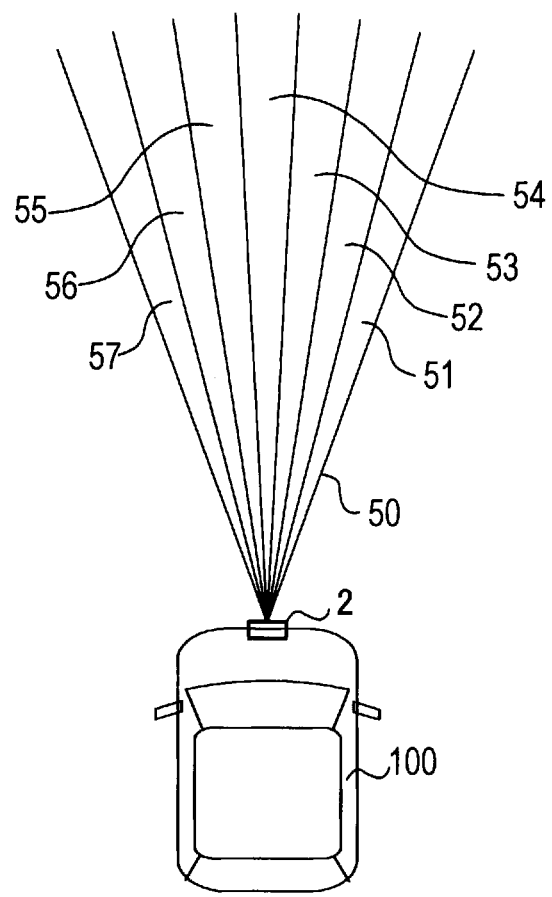

MONITORING APPARATUS AND NON-TRANSITORY COMPUTER-READABLE MEDIUM

BACKGROUND

Technical Field

The present invention relates to a monitoring apparatus mounted in an own vehicle and a non-transitory computer-readable medium.

Background Art

Conventionally, a driving assistance technique is known for detecting an object, such as a vehicle traveling around an own vehicle or a roadside wall or the like, with use of a laser radar, a camera or the like, and based on the detection result, providing driving assistance. However, an airborne substance, such as mist present on a roadway or an exhaust gas from a preceding vehicle or the like, that is not an obstacle a driver usually attempts to avoid, may be detected as an object, which may prevent proper driving assistance.

An object detection apparatus disclosed in Patent Literature 1 uses a sensor, such as a stereoscopic camera or the like, to measure a distance to an object located forward of the own vehicle on a pixel block-by-pixel block basis, where the pixel blocks are laterally arranged in-line. Based on the measured distances, the apparatus, in a top plan view of the own vehicle, plots a point to an object position for each pixel block and groups adjacent points to thereby detect individual objects, and for each object, calculates an average deviation of distances to the corresponding points and an average of absolute values of differences between distances to the adjacent points (average distance difference). Finally, if the average deviation and the average distance difference exceed respective predetermined thresholds, the apparatus determines that the object as being an airborne substance because of its high variation of the distances to the points corresponding the object.

Technical Problem

The applicants have identified that, as shown in FIG. 9, for example, in a configuration where a probe wave is irradiated to a search range having a width in a widthwise direction of the own vehicle increasing in the forward direction (going away direction) from the centered front end of the own vehicle to scan the search range, and in each direction a distance to a corresponding point is measured, the variation of the distances to the points corresponding to the object varies with distances from the own vehicle to the object even if the object is located at different distances from the own vehicle with the same orientation. More specifically, the variation of the distances to the points corresponding to the object increases with increasing distance from the own vehicle. That is, the variation of the distances to the points corresponding to the object decreases with decreasing distance from the own vehicle.

In contrast, in the object detection apparatus disclosed in Patent Literature 1, a threshold used to determine the presence or absence of an airborne substance takes a fixed value. Therefore, for example, even if an object located close to the own vehicle is an airborne substance, a measure of variation, such as the average deviation or the average distance difference, may be below the threshold and the object thus may be incorrectly determined as a non-airborne substance (that is, an obstacle). Thus, there is a problem that if the driving assistance apparatus of the own vehicle determines the airborne substance as an obstacle and then activates the automatic brake in providing collision avoidance control, and travel of a following vehicle may be unnecessarily affected.

SUMMARY

In consideration of the foregoing, it is desired to have a monitoring apparatus and a non-transitory computer readable medium for accurately determining whether or not at least part of an object located in a search range is an airborne substance.

According to one embodiment of the present invention, there is provided a monitoring apparatus mounted in an own vehicle. The apparatus includes a rangefinder configured to, for each of a plurality of unit areas forming a search range around the own vehicle, measure a distance to an object located in the search range and a variation measure calculator configured to calculate a variation measure indicative of the magnitude of variations of individual distances that are the distances measured by the rangefinder for the respective unit areas in the search range.

In the apparatus, a variable threshold setter is configured to variably set a variation measure threshold based on the individual distances, and a determiner is configured to perform an airborne substance determination process of determining that at least part of the object is an airborne substance if the variation measure calculated by the variation measure calculator exceeds the variation measure threshold set by the variable threshold setter.

As described above, also for an exhaust gas, mist or the like (an airborne substance) that is not an obstacle a driver usually attempts to avoid, the magnitude of variations (variation measure) of the individual distances in the search range varies with distances from the own vehicle. The variation measure increases with increasing distance from the own vehicle, and the variation measure decreases with decreasing distance from the own vehicle.

Therefore, in the monitoring apparatus of the present invention, a threshold (variation measure threshold) is variably set depending on the measured distances (individual distances), and if the variation measure exceeds the threshold, then it is determined that at least part of the object is an airborne substance.

In the monitoring apparatus, the variation measure threshold is variably set such that the variation measure threshold is increased with increasing distance to the object based on the measured distances (individual distances) and the variation measure threshold is decreased with decreasing distance to the object based on the measured individual distances. That is, the variation measure threshold is variably set depending on the position of the object relative to the own vehicle, which can improve accuracy of determining the presence or absence of the airborne substance. The distance to the object based on the measured individual distances may be an average of the individual distances in the search range or may be a median of the individual distances in the search range.

The present invention can be marketed as a non-transitory computer-readable medium storing a computer program. More specifically, a computer readable medium storing a computer program may be provided that can be executed by a computer to enable the computer to serve as the rangefinder, the variation measure calculator, the variable threshold setter, and the determiner described above, or a computer readable medium storing a computer program may be provided that can be executed by a computer including the rangefinder to enable the computer to serve as the variation measure calculator, the variable threshold setter, and the determiner described above.

Incorporation of such a computer program into a single computer or plural computers can provide similar advantages to those of the monitoring apparatus of the present invention. The non-transitory computer-readable medium of the present invention may be ROM or a flash memory or the like to be incorporated in the computer. The computer program may be loaded from the ROM or the flash memory or the like onto the computer, or may be loaded onto the computer via a network.

The non-transitory computer-readable medium storing the above computer program includes, for example, a portable semiconductor memory (e.g., a USB memory or memory card) or the like.

BRIEF DESCRIPTION OF DRAWINGS

FIG. 2 is an example of a vehicle carrying the monitoring apparatus and a search range of the monitoring apparatus;

DESCRIPTION OF EMBODIMENTS

The present invention will now be described more fully hereinafter with reference to the accompanying drawings. The present invention is not in any way limited to the specific embodiments described below. Further, an embodiment with part of the above configuration omitted while it remains capable of solving the problem is also included in the embodiment of the present invention. Any embodiment which could be made without departing from the spirit of the invention as defined solely by the terms in the appended claims is included in the embodiment of the present invention. Although references used in the description of the above embodiment are also used in the appended claims for ease of understanding, it is not intended to limit the technical scope of the invention defined by the appended claims.

Configuration

Figure 1A:
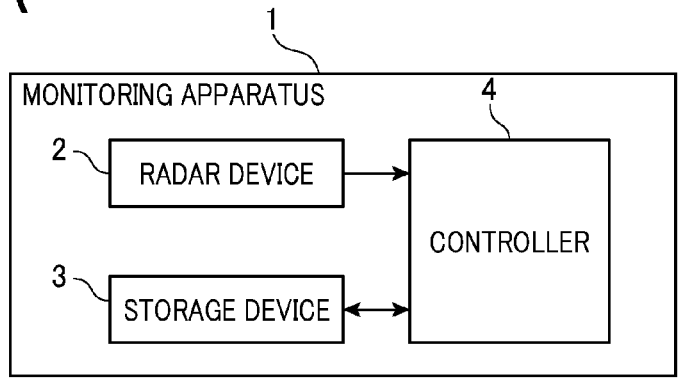
FIG. 1A is a block diagram of a monitoring apparatus in accordance with one embodiment of the present invention.

FIG. 1A is a block diagram of a monitoring apparatus 1 in accordance with one embodiment that is configured to use a radar wave or the like to detect an object located in a predetermined search range, and provide a detection result to other driving assistance apparatuses mounted in one's own vehicle via an in-vehicle local area network (in-vehicle LAN) (not shown).

The monitoring apparatus 1 includes a radar device 2, a storage device 3 configured as a non-volatile storage device, such as a flash memory, and a controller 4 primarily formed of CPU, ROM, and RAM to integrally control the monitoring apparatus 1.

As shown in FIG. 2, the radar device 2 is attached to a centered front end of the own vehicle 100 and configured to irradiate a radar wave (laser light in the present embodiment) as a probe wave and receive the reflected wave to thereby detect the object located in the search range 50 forward of the own vehicle. The radar device 2 transmits and receives the radar wave periodically at search time intervals (for example, every 100 ms) and then transmits to the controller 4 ranging data indicative of a distance to the object located in the search range 50.

The search range 50 is a fan-like range having a width in the widthwise direction increasing in the forward direction of the own vehicle. The search range 50 are divided into a plurality of (seven in the present embodiment) fan areas (hereinafter referred to as unit areas 51-57) having equal central angles as unit angles.

Figure 3:
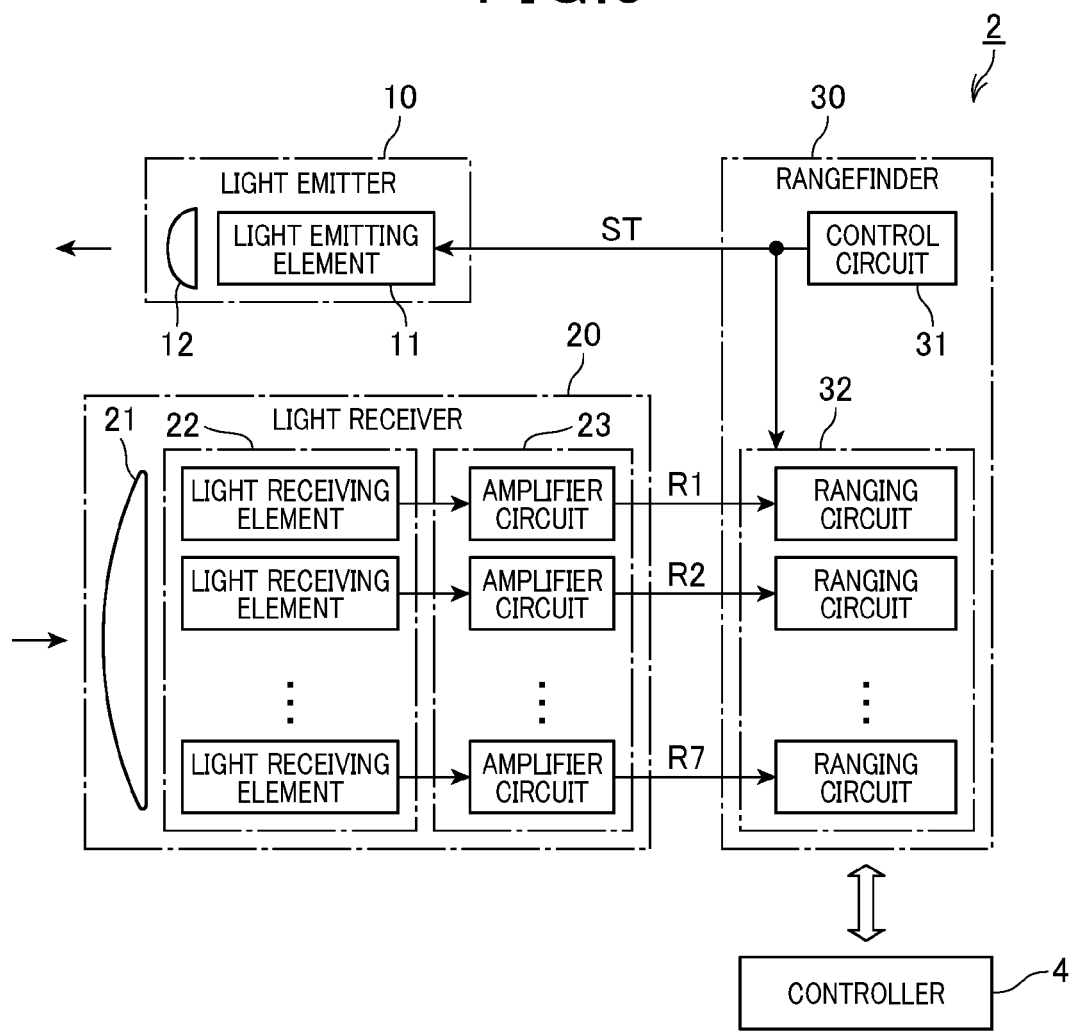
FIG. 3 is a block diagram of a radar device of the monitoring apparatus.

FIG. 3 is a block diagram of the radar device 2. The radar device 2 includes a light emitter 10 that irradiates pulsed laser light (transmit wave) to the search range 50 in response to a search timing signal ST, and a light receiver 20 that receives reflected light (reflection) from the object and converts it to electrical signals (receipt signals) R1-R7 as a function of the intensity of the received light.

The radar device 2 further includes a rangefinder 30 that generates the search timing signal ST to be provided to the light emitter 10. Based on the receipt signals R1-R7 from the light receiver 20, the rangefinder 30 generates ranging data about the object reflecting the laser light for each of the unit areas 51-57 forming the search range 50 and provides the ranging data to the controller 4. In the present embodiment, the rangefinder 30 and the controller 4 are separate members. Alternatively, the rangefinder 30 and the controller 4 may be integrated with each other. Still alternatively, the rangefinder 30 and the controller 4 may be included in the controller.

The light emitter 10 includes a light emitting element 11 formed of a radar diode or the like that generates the laser light in response to the search timing signal ST, and a collimating lens 12 that adjusts an illumination range (scanning range) of the laser light emitted from the light emitting element 11 so that the laser light can be irradiated to the search range 50 (the respective unit areas 51-57).

The light receiver 20 includes a collecting lens 21 that collects the reflected light incoming from the search range 50 (the respective unit areas 51-57) and a plurality of (seven in the present embodiment) light receiving elements 22 that generate electrical signals as a function of the intensity of the reflected light received via the collecting lens 21. To individually amplify light receipt signals from the respective light receiving elements 22, the light receiver 20 further includes a plurality of amplifier circuits 23 provided for the respective light receiving elements.

The light receiving elements 22 are arranged in-line along the widthwise direction (horizontal direction) such that the light receiving elements 22 can receive the reflected light incoming from the respective unit areas 51-57 forming the search range 50.

That is, given light receiving channels CH1-CH7, each formed of one of the light receiving elements and its associated amplifier circuit, the receipt signal Ri (i=1-7) is a signal outputted from the light receiving channel CHi (i=1-7) and then amplified.

The rangefinder 30 includes a control circuit 31 that generates the search timing signal ST, and a plurality of ranging circuits 32 provided for the respective receipt signals R1-R7. Based on each of the receipt signals Ri and the search timing signal ST, the ranging circuits 32 measure the time it takes for the radar wave to travel to and from the object, generate ranging data that associates a distance acquired from the measurement and the corresponding unit area 51-57 (i.e., a direction in which the object exists), and provides the ranging data to the controller 4.

Operations

Operations of the monitoring apparatus 1 will now be explained. The monitoring apparatus 1 of the present embodiment irradiates a radar wave to detect an object, such as a vehicle present forward of the own vehicle, as an obstacle, and provides the detection result to another driving assistance apparatus. However, in the presence of particulates, such as an exhaust gas or mist or the like, in a space forward of own vehicle (airborne substance), the airborne substance may be detected as an obstacle. This may prevent the driving assistance apparatus from providing proper driving assistance.

The distances measured for the respective unit areas 51-57 (measured distances) are distances to reflection points reflecting the radar wave located in the respective unit areas 51-57. For example, in the presence of a solid object, e.g., a vehicle 110 or the like, in the search range 50, relative positions of a plurality of reflection points 210 of the vehicle 110 recognized in the monitoring apparatus 1 may always remain substantially unchanged (see FIG. 4).

Figure 5A:
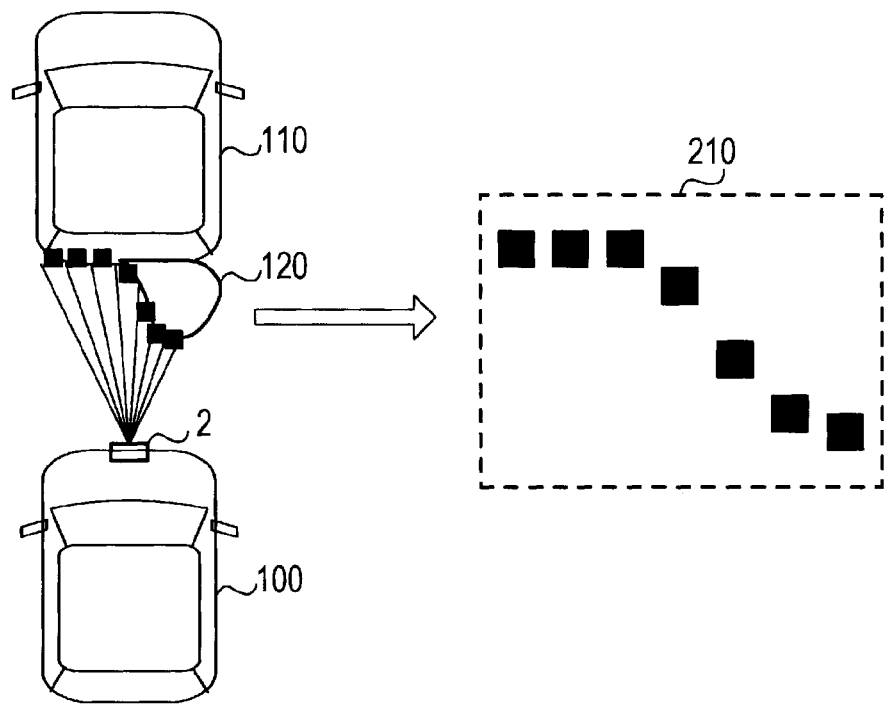
FIGS. 5A and 5B are examples of reflection points reflecting a radar wave when another vehicle and an airborne substance are detected by the monitoring apparatus.
Figure 5B:
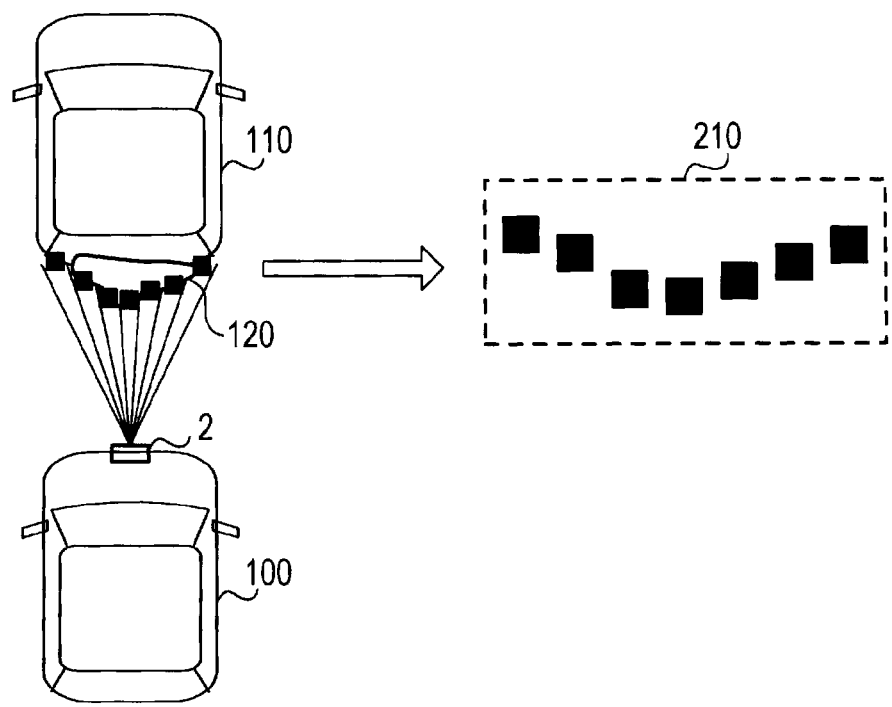

However, for example, if the airborne substance 120, such as an exhaust gas or the like, is detected together with the vehicle 110, the reflection points 210 of the airborne substance 120 become unstable in position (see FIGS. 5A, 5B) unlike the solid object because particulates forming the airborne substance 120 are prone to moving under the effect of wind or the like.

The monitoring apparatus 1 calculates a value indicative of the magnitude of variations (hereinafter referred to as a quantitative measure of variation or a variation measure) of distances (individual distances) measured for the respective unit areas 51-57 in the search range 50, and if the calculated measure of variation exceeds a predetermined threshold (variation measure threshold described later), determines that at least part of the object is an airborne substance located in the search range 50.

Figure 4:
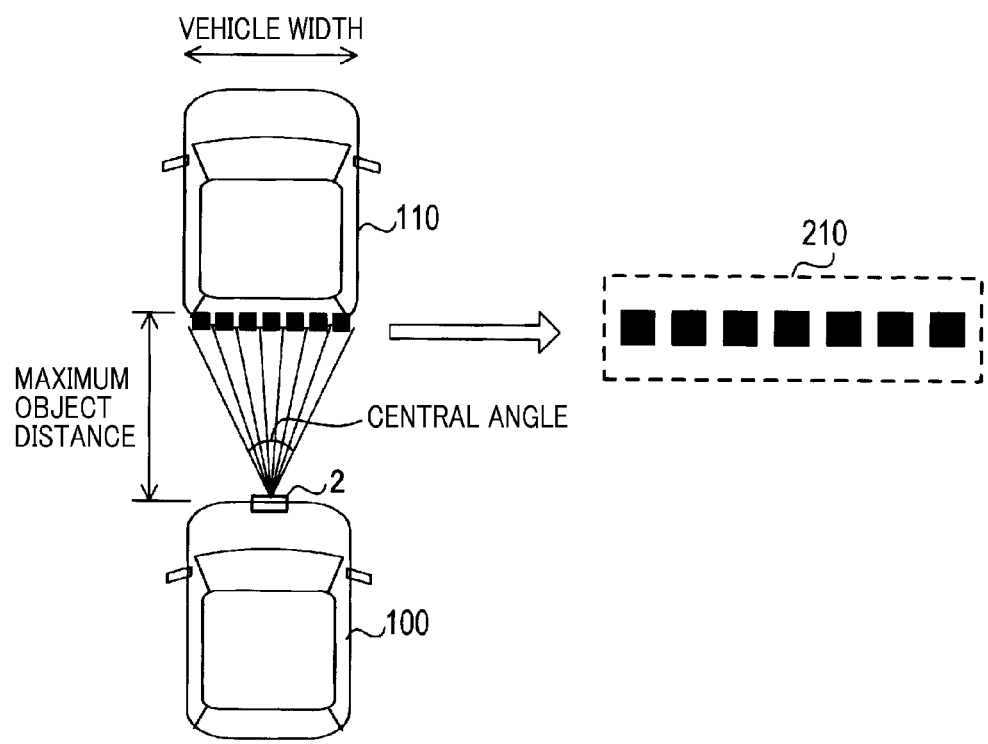
FIG. 4 is an example of reflection points reflecting a radar wave when another vehicle is detected by the monitoring apparatus.

In the monitoring apparatus 1 of the present embodiment, only for an object located at a distance equal to or less than a maximum object distance from the own vehicle 100 as shown in FIG. 4, it is determined whether or not the object is an airborne substance. The maximum object distance may be preset such that reflection points at both side ends of a plurality of reflection points 210 as shown in FIG. 4 are positioned at both side ends of a rear portion of a pre-assumed vehicle (as an assumed vehicle). That is, in the monitoring apparatus 1, the maximum object distance is a distance predetermined to detect a single preceding vehicle. The maximum object distance may be an indicator that indicates that if the measured distance (individual distance) exceeds the maximum object distance, it becomes more likely that a plurality of preceding vehicles are detected.

A vehicle width of the assumed vehicle may be equal to a vehicle width of the own vehicle or a vehicle width of an arbitrary vehicle that can be assumed to be a vehicle forward of the own vehicle (preceding vehicle). In the monitoring apparatus 1, the maximum object distance may be set to a width of a small vehicle, such as a minicar or the like, as the assumed vehicle, which makes it easier to detect a single preceding vehicle whatever vehicle width the single vehicle has.

Based on a result of determining the presence or absence of the airborne substance and the ranging data received from the monitoring apparatus 1, the driving assistance apparatus connected to the monitoring apparatus 1 performs collision avoidance control (as vehicle control) to output a warning alert or activate the automatic brake according to the distance to the object to prevent collision between the own vehicle and the obstacle or mitigate collision damage. In this way, the driving assistance apparatus, in conjunction with the monitoring apparatus 1, provides so called a pre-crash safety system. Further, if, based on the determination result and the ranging data received from the monitoring apparatus 1, it is determined that at least part of the object is an airborne substance, the driving assistance apparatus adjusts the collision avoidance control to inhibit the braking operation, for example, at least delay activation of the automatic brake, to prevent the own vehicle from stopping in front of the airborne substance.

Determination Process

Figure 6:
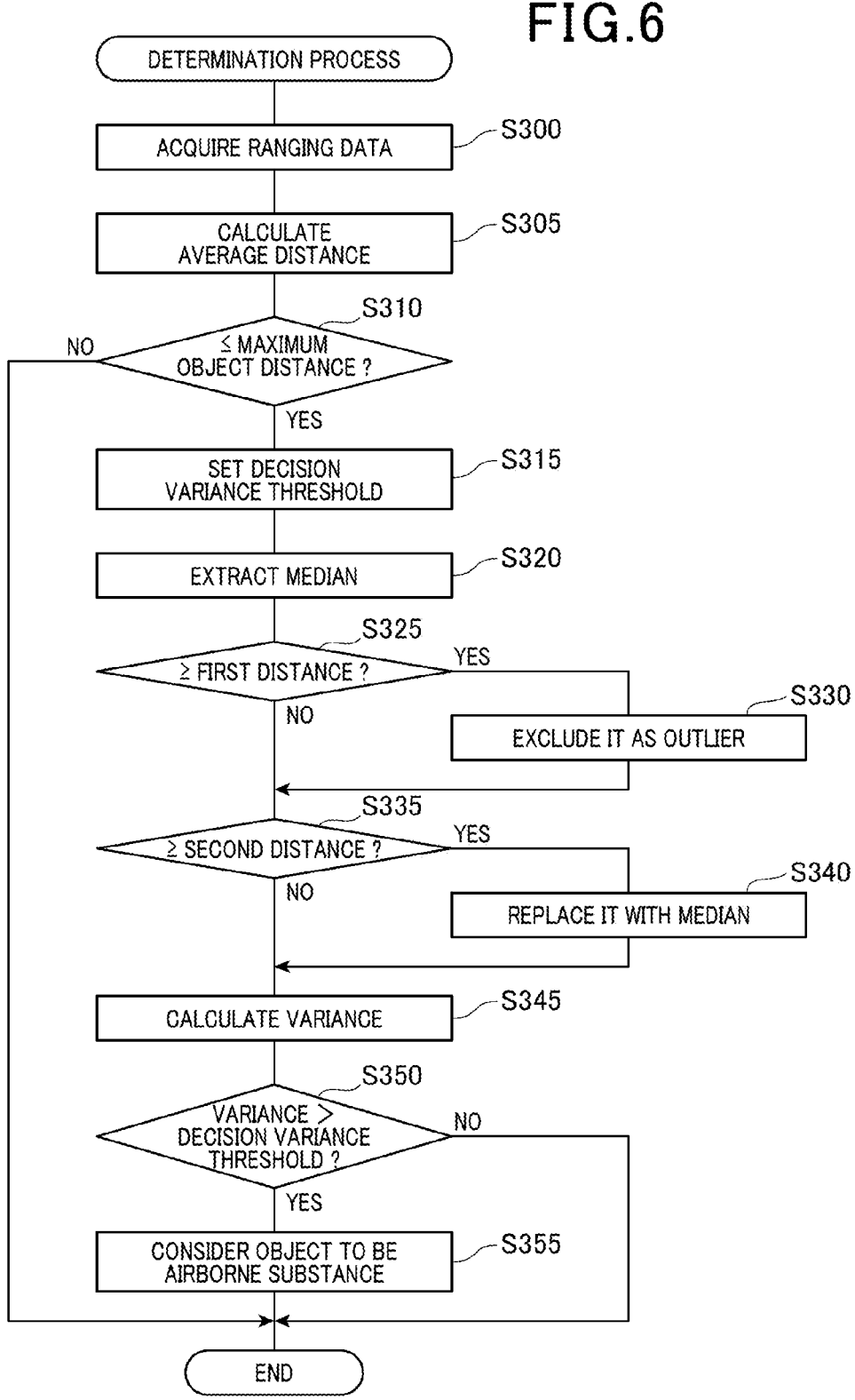
FIG. 6 is a flowchart of a determination process of determining the presence or absence of an airborne substance to be performed in a controller of the monitoring apparatus.

A process of determining whether or not at least part of the object detected by using the radar wave is an airborne substance will now be explained with reference to a flowchart of FIG. 6. In the present embodiment, this process is performed in the controller (more specifically, the CPU) of the monitoring apparatus 1. Computer programs that the CPU executes to perform the determination process are stored in a nonvolatile memory (as a non-transitory computer-readable medium), such as the ROM or the storage device 3 or the like. Based on the computer programs stored in such a nonvolatile memory, the CPU uses the RAM as a working area to perform the process. The determination process is initiated upon arrival of the search timing.

When the determination process is commenced, the controller 4, in step S300, acquires from the ranging circuits 32 the ranging data for all the respective unit areas 51-57, and based on the acquired ranging data, determines the distances (individual distances) measured corresponding to the respective unit areas 51-57. Then, the process proceeds to step S305.

In step S305, based on the individual distances for the respective unit areas 51-57 determined in step S300, the controller 4 calculates an average of the individual distances in the search range 50 (referred to as an average distance). Subsequently, in step S310, the controller 4 determines whether or not the average distance calculated in step S305 is equal to or less than the maximum object distance. If the average distance is equal to or less than the maximum object distance, then the process proceeds to step S315. If the average distance is greater than the maximum object distance, then the process ends. That is, if the average distance exceeds the maximum object distance, it may be likely that a plurality of preceding vehicles are detected as an object. Therefore, ending the process makes it possible to determine whether or not an airborne substance is included in at least part of the object without the grouping process (see Patent Literature 1).

Figure 7:
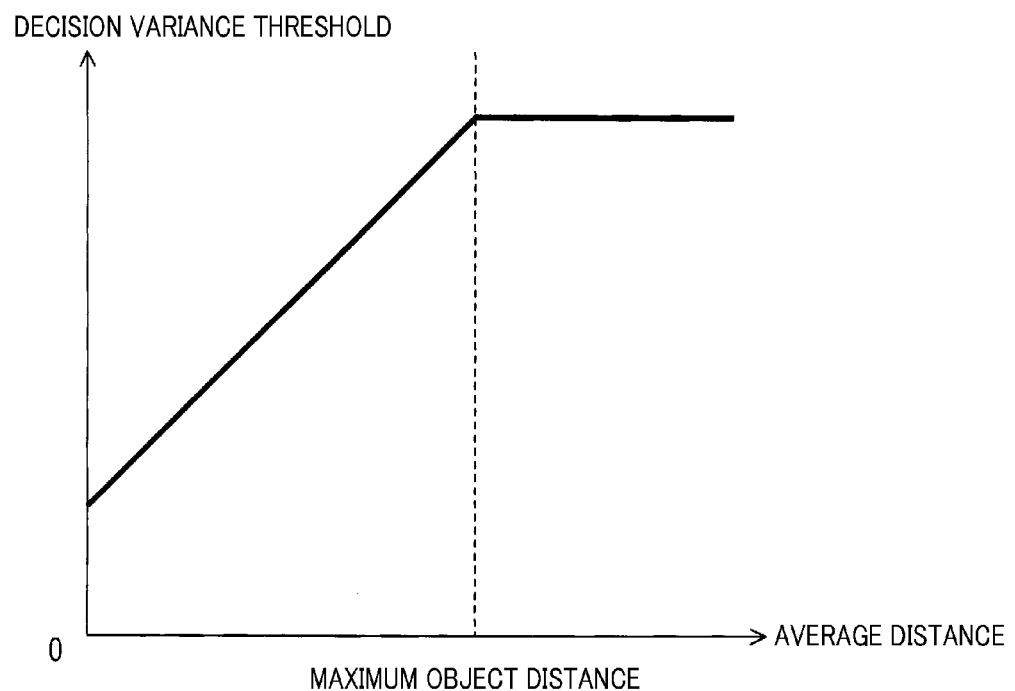
FIG. 7 is an example correlation between an average distance (distance to an object based on individual distances) and a decision variance threshold.

In step S315, based on the average distance calculated in step S305, the controller 4 sets a variation measure threshold used in the subsequent steps (in the present embodiment, referred to as a decision variance threshold). As for a correlation between the decision variance threshold and the average distance, as shown in FIG. 7, the decision variance threshold increases with increasing average distance (i.e., the object is located farther away from the own vehicle). The decision variance threshold decreases with decreasing average distance (i.e., the object is located closer the own vehicle). As above, if the average distance exceeds the maximum object distance, the process ends. This is because the decision variance threshold is set to a fixed value. Data indicative of the correlation is stored beforehand in the storage device 3. Thus, the controller 4 is allowed to access the data stored in the storage device 3 and read the decision variance threshold corresponding to the average distance calculated in step S305.

Figure 8A:
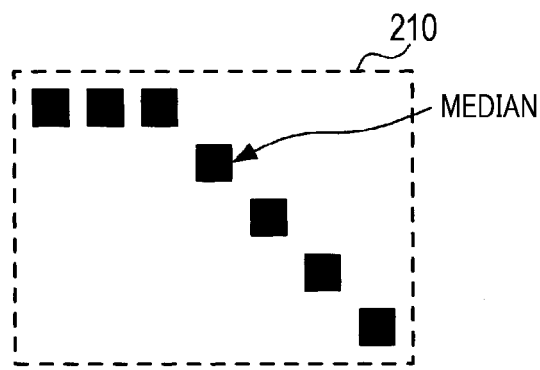
FIGS. 8A to 8D are examples of a median, an outlier, a first distance, and a second distance of individual distances in a search range.

In step S320, the controller 4 extracts a median of the individual distances for the respective unit areas 51-57 as arranged in ascending order of distance (see FIG. 8A). In the present embodiment, an odd number of individual distances are shown as an example. In a configuration of the monitoring apparatus 1 where there are an even number of individual distances, the median may be given by an average of center two individual distances.

Figure 8B:
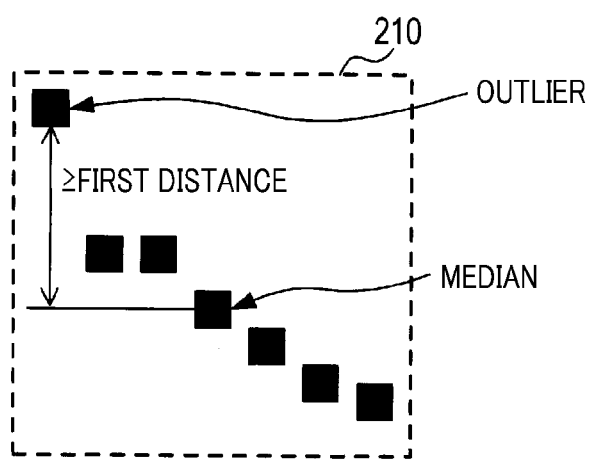

In step S325, the controller 4 determines whether or not there is an individual distance, of the individual distances for the respective unit areas 51-57 determined in step S300, a difference value of which from the median extracted in step S320 is equal to or greater than a predetermined first distance. If there is such an individual distance, then the process proceeds to step S330, where such an individual distance is excluded as an outlier (see FIG. 8B). Otherwise, the process proceeds to step S335.

Figure 8C:
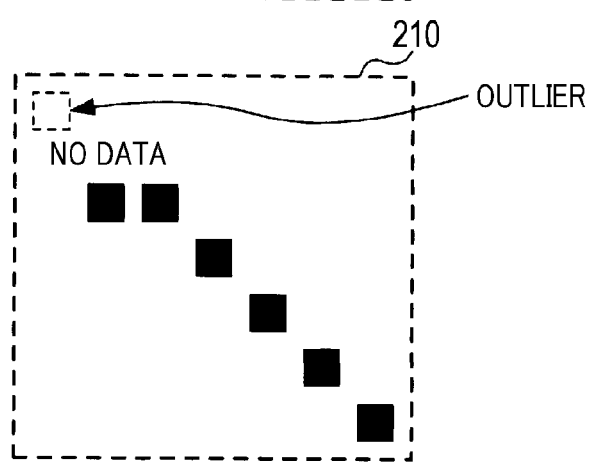

The outlier may be an individual distance measured based on a reflection from something other than an object intended to be detected, such as an airborne substance or a single preceding vehicle (e.g., a vehicle adjacent to the preceding vehicle (adjacent vehicle), a roadside object or the like). In addition, as shown in FIG. 8C, the outlier may be an individual distance deviating significantly from the median, of the individual distances measured in the presence of an unit area in which no reflection can be detected (a corresponding individual distance cannot be detected) or in the presence of cross talk or waveform synthesis between the radar wave and its reflections. A number of individual distances to be excluded in step S330 may be determined beforehand, or a maximum or minimum number of individual distances to be excluded in step S330 may be determined beforehand.

Figure 8D:
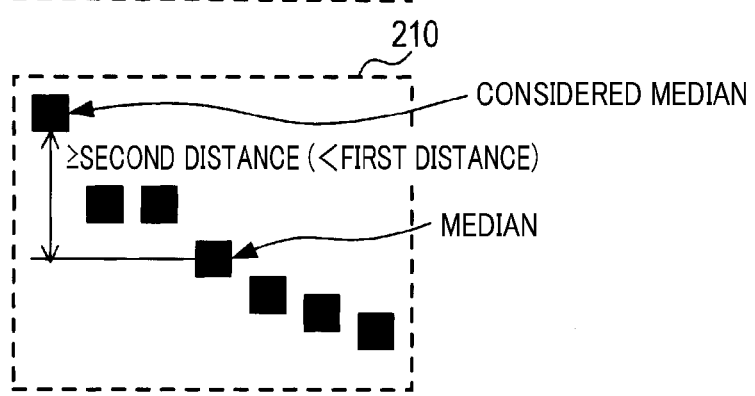
Figure 9:
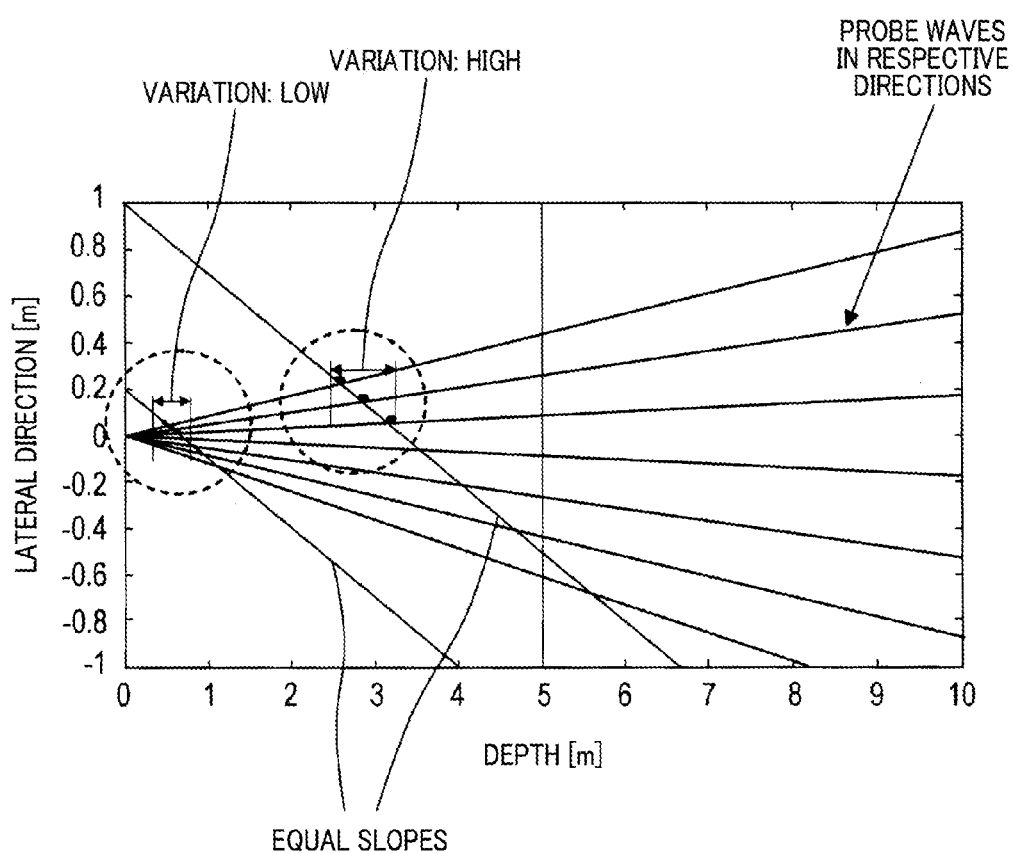
FIG. 9 is a schematic of a relationship between a position of an object relative to an own vehicle and the magnitude of variations.

In step S335, the controller 4 determines whether or not there is an individual distance, of the individual distances for the respective unit areas 51-57 determined in step S300 other than the outlier(s) excluded in step S330, a difference value of which from the median extracted in step S320 is equal to or greater than a predetermined second distance. If there is such an individual distance, then the process proceeds to step S340, where such an individual distance that is equal to or greater than the first distance is replaced with the median (see FIG. 8D). Otherwise, the process proceeds to step S345.

The second distance takes a value predetermined based on a maximum depth of the airborne substance that can be assumed by experiment or simulation or the like. In the present embodiment, the second distance is set less than the first distance.

In step S345, based on the individual distances for the respective unit areas 51-57 determined in step S300, or more specifically, based on the individual distances for the respective unit areas 51-57 that have remained after the exclusion in step S330 and the replacement in step S340, the controller 4 calculates a variance as the variation measure of the individual distances in the search range 50.

Figure 1B:
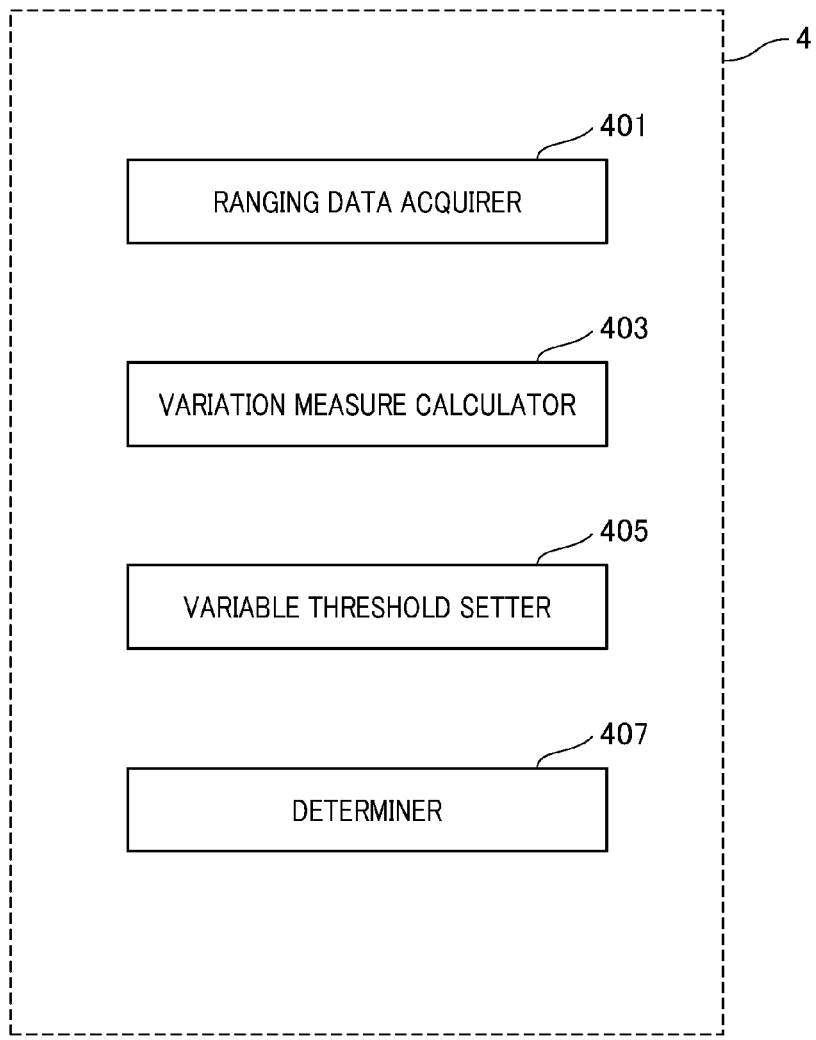
FIG. 1B is a block diagram of a controller shown in FIG. 1A.

In step S350, the controller 4 determines whether or not the variance calculated in step S345 is greater than the decision variance threshold set in step S315. If the variance is greater than the decision variance threshold, then the process proceeds to step S355, where at least part of the object located in the search range 50 is considered to be an airborne substance. Thereafter, the process ends. If the variance is equal to or less than the decision variance threshold, the process immediately ends. The determination result, as well as the ranging data acquired in step S300 via the in-vehicle local area network (in-vehicle LAN), is provided to the driving assistance apparatus. As shown in FIG. 1B, the controller 4 includes a ranging data acquirer 401, a variation measure calculator 403, a variable threshold setter 405, and a determiner 407. The ranging data acquirer 401 is responsible for execution of step S300, the variation measure calculator 403 is responsible for execution of steps S320-S345, the variable threshold setter 405 is responsible for execution of step S315, and the determiner 407 is responsible for execution of steps S350, S355. The ranging data acquirer 401, the variation measure calculator 403, the variable threshold setter 405, and the determiner 407 may be implemented by the CPU executing the computer programs stored in the storage device 3. In the present embodiment, the rangefinder 30 of the radar device 2 and the ranging data acquirer 401 are cooperatively operable to measure the individual distances to the object 110 or 120 present in the search range 50 formed of the plurality of unit areas 51-57 around the own vehicle, where the individual distances to the object are measured corresponding to the respective unit areas 51-57.

Advantages

As described above, in the monitoring apparatus 1, when the determination process is commenced, a distance to an object located in the search range 50 is measured for each of the unit areas 51-57 (in step S300), the variance of the distances (individual distances) measured for the respective unit areas 51-57 is calculated (in step S345), and based on the individual distances, the decision variance threshold is set (in step S315). If the calculated variance exceeds the decision variance threshold (YES in step S350), then it is determined that at least part of the object is an airborne substance (in step S355).

In the monitoring apparatus 1, the variance decision threshold is variably set such that the decision variance threshold is increased with increasing distance to the object based on the measured individual distances and the decision variance threshold is decreased with decreasing distance to the object based on the measured individual distances. That is, the decision variance threshold is variably set depending on the position of the object relative to the own vehicle, which can improve accuracy of determining the presence or absence of the airborne substance.

In addition, in the monitoring apparatus 1, if the distance to the object based on the measured individual distances is equal to or less than the maximum object distance based on the central angle of the search range and a vehicle width of the pre-assumed vehicle (assumed vehicle) (YES in step S310), then the presence or absence of the airborne substance is determined. This can eliminate a need for grouping of reflection points (see Patent Literature 1), thereby reducing a processing load.

In addition, in the monitoring apparatus 1, during the determination process, the median of the individual distances in the search range 50 is extracted (in S320), and the variance is calculate with respect to the median. Therefore, the median is barely affected even if there are some of the individual distances that may inflate the average of the individual distances. Thus, an individual distance measured based on a reflection from something other than an object intended to be detected, such as an airborne substance or a single preceding vehicle (i.e., the outlier) barely affects a measure of the variance, which can lead to improved accuracy of determining the presence or absence of the airborne substance.

In the monitoring apparatus 1, during the determination process, those of the individual distances in the search range 50, difference values of which from the median are equal to or greater than the predetermined first distance, are excluded to calculate the variance (YES in step S325 and step S330). Therefore, an individual distance, of the measured distanced (individual distance), unrelated to an object intended to be detected barely affects the calculation of the variance, which can lead to improved accuracy of determining the presence or absence of the airborne substance.

In the monitoring apparatus 1, during the determination process, those of the individual distances in the search range 50, difference values of which from the median are equal to or greater than the predetermined second distance, are replaced with the median to calculate the variance (YES in step S335 and step S340). This can prevent a measured distance (individual distance) that may lead to an unnaturally large airborne substance from inflating the deviation, which can lead to improved accuracy of determining the presence or absence of the airborne substance.

Other Embodiments

Although the invention has been described in terms of particular embodiments, additional embodiments and modifications can be generated without departing from the spirit of or exceeding the scope of the claimed invention.

For example, in the determination process of the above embodiment, the average distance is calculated as the distance to the object based on the measured individual distances (in step S305). The decision variance threshold is set based on the calculated average distance. Alternatively, the decision variance threshold may be set based not on the average distance, but on the median extracted in step S320. Still alternatively, the decision variance threshold may be set based on any one of the individual distances determined in step S300.

In the determination process of the above embodiment, the median is extracted as a distance to the object based on the measured individual distances (in step S320), and the variance is calculated with respect to the extracted median. Alternatively, in the calculation of the variance, the variance may be calculated with respect not to the median, but to the average distance calculated in step S305.

In the determination process of the above embodiment, both the exclusion of the outlier (in step S330) and the replacement with the median (in step S340) are performed. Alternatively, either the exclusion of the outlier (in step S330) or the replacement with the median (in step S340) may be performed. Still alternatively, none of the exclusion of the outlier (in step S330) and the replacement with the median (in step S340) may be performed. For example, if only the replacement with the median is performed (in step S340), the second distance is not necessarily less than the first distance.

In the determination process of the above embodiment, the variance is calculated as the variation measure of the individual distances in the search range 50 (in step S345). The variation measure is not limited to the variance. Alternatively, for example, the variation measure may be an average deviation or an average distance difference. In such an embodiment, the decision variance threshold as the variation measure threshold may be properly set depending on what is employed as the variation measure.

In the monitoring apparatus 1 of the above embodiment, the laser light is irradiated to detect a target located in the search range 50. Alternatively, another type of probe wave (radar wave), such as a millimeter wave or an ultrasonic wave or the like, may be irradiated. Still alternatively to a sensor using the radar wave, another type of sensor, such as a stereoscopic camera or the like, may be used. For example, when the stereoscopic camera is used, the central angle of the search range 50 may be replaced with an angle of view.

CROSS-REFERENCE TO RELATED APPLICATION

This application claims priority under the Paris Convention on Japanese Patent Application No. 2013-150503 (filed Jul. 19, 2013), the content of which is incorporated by reference herein.

REFERENCE SIGNS LIST

1 . . . MONITORING APPARATUS
2 . . . RADAR DEVICE
3 . . . STORAGE DEVICE
4 . . . CONTROLLER
10 . . . LIGHT EMITTER
11 . . . LIGHT EMITTING ELEMENT
12 . . . COLLIMATING LENS
20 . . . LIGHT RECEIVER
21 . . . COLLECTING LENS
22 . . . LIGHT RECEIVING ELEMENTS
23 . . . AMPLIFIER CIRCUITS
30 . . . RANGEFINDER
31 . . . CONTROL CIRCUIT
32 . . . RANGING CIRCUITS
50 . . . SEARCH RANGE
51-57 . . . UNIT AREA
120 . . . AIRBORNE SUBSTANCE
210 . . . REFLECTION POINT
401 . . . RANGING DATA ACQUIRER
403 . . . VARIATION MEASURE CALCULATOR
405 . . . VARIABLE THRESHOLD SETTER
407 . . . DETERMINER

The invention claimed is:

1. A monitoring apparatus mounted in an own vehicle, the apparatus comprising:
a rangefinder configured to, for each of a plurality of unit areas forming a search range around the own vehicle, measure a distance to an object located in the search range;

a variation measure calculator configured to calculate a variation measure indicative of the magnitude of variations of individual distances that are the distances measured by the rangefinder for the respective unit areas in the search range;

a variable threshold setter configured to variably set a variation measure threshold based on the individual distances; and a determiner configured to perform an airborne substance determination process of determining that at least part of the object is an airborne substance if the variation measure calculated by the variation measure calculator exceeds the variation measure threshold set by the variable threshold setter.

2. The apparatus of claim 1, wherein the search range has a width in a widthwise direction of the own vehicle increasing in a forward direction from a centered front end of the own vehicle, each of the plurality of unit areas has a unit central angle that is a central angle of the search range divided by a number of unit areas and a width in the widthwise direction of the own vehicle increasing in the forward direction of the own vehicle, and the determiner is configured to perform the airborne substance determination process if the distance to the object based on the measured individual distances is equal to or less than a maximum object distance based on the central angle of the search range and a width of a pre-assumed vehicle.

3. The apparatus of claim 2, wherein the variation measure calculator is configured to extract a median of the individual distances in the search range and calculate the variation measure with respect to the median.

4. The apparatus of claim 3, wherein the variation measure calculator is configured to exclude those of the individual distances in the search range, difference values of which from the median are equal to or greater than a predetermined first distance, to calculate the variation measure.

5. The apparatus of claim 3, wherein the variation measure calculator is configured to replace those of the individual distances in the search range, difference values of which from the median are equal to or greater than a predetermined second distance, with the median to calculate the variation measure.

6. A computer readable medium storing a computer program that can be executed by a computer to enable the computer to serve as the rangefinder, the variation measure calculator, the variable threshold setter, and the determiner of any one of claims 1-5.

7. A computer readable medium storing a computer program that can be executed by a computer comprising the rangefinder to enable the computer to serve as the variation measure calculator, the variable threshold setter, and the determiner of any one of claims 1-5.

* * * * *